Sept. 12, 1967  W. F. SIEVERS, JR  3,340,575
GIN STAND SEED COTTON ROLL CORE
Filed July 8, 1965
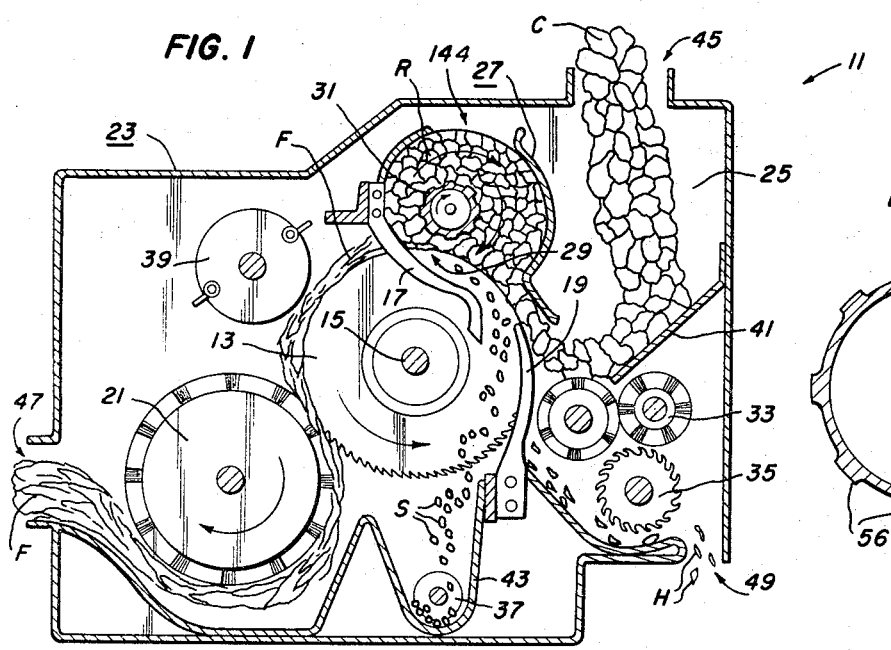
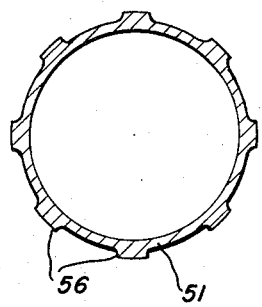
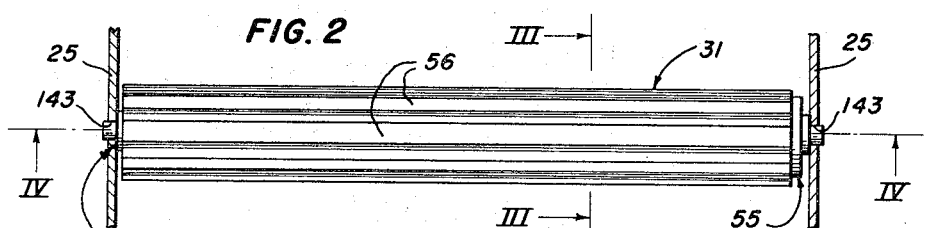
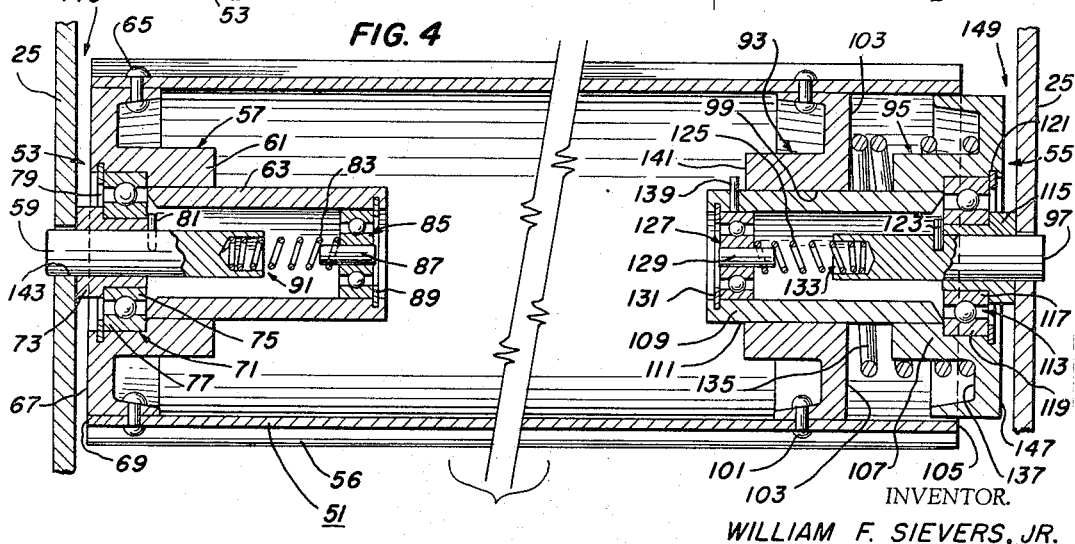
INVENTOR.
WILLIAM F. SIEVERS, JR.
BY John R. Walker, II
Attorney United States Patent Office 3,340,575
Patented Sept. 12, 1967

3,340,575
GIN STAND SEED COTTON ROLL CORE
William F. Sievers, Jr., 3233 Homewood Drive,
Memphis, Tenn. 38128
Filed July 8, 1965, Ser. No. 470,450
10 Claims. (Cl. 19—55)

ABSTRACT OF THE DISCLOSURE

An improved float or core member of the type adapted to be idly journaled in a gin stand seed roll box. A generally cylindrical lightweight core member having low inertial weight and having spring-urged plunger-like axles for easy snap-in installation. An improved roll core member having telescopic-like extendable means for automatically varying the length of the roll core for accommodating various gin stand widths and for causing close and gapless fitting at the opposite ends of the roll core with the opposite end walls of the gin stand.

---

This invention relates generally to cotton gins, and particularly relates to a high capacity seed cotton roll core for use in the gin stand of a cotton gin.

The gin stand of a cotton gin is the principal or basic machine unit; it comprises that part of the gin machinery which specifically or actually separates the fiber and seed of the cotton plant harvested seed cotton.

A gin stand includes a multiplicity of substantially small-diameter, thin gin saws mounted juxtaposedly in a gang on a shaft, and a multiplicity of so-called ginning ribs fixedly arranged respectively in the spaces between the gin saws. In operation, seed cotton is fed into the saw teeth of the gang of gin saws, and the cotton fiber is pulled between the ginning ribs and from the seed. The fiber typically is doffed or removed from the saw teeth by a brush cylinder.

The typical gin stand also includes wall structure defining a somewhat cylindrical seed roll box housing or enclosure for receiving the seed cotton. The seed roll box is provided with a longitudinally extending, broad slot in the bottom thereof, and is so arranged that the ginning ribs and rim portions of the revolving gang of gin saws are disposed in the slot and partially in the seed roll box enclosure.

Seed cotton is fed into the box enclosure and is crowded or urged by the weight of the cotton against the saw-teeth of the rapidly rotating gin saws. The saws acting on the cylindrical periphery of the cotton in the box enclosure, cause the cotton to rotate in a mass, forming a so-called seed cotton roll or seed roll.

The density of the revolving mass or seed roll of cotton is very important, and the gin stand operator, by visually observing or by feeling the roll with his hand, can accurately determine the efficiency of the gin stand. Regulating the feed of the amount of seed cotton coming into the roll box controls the density of the seed roll. Typically, the rotating seed roll is maintained in a loose or slightly firm consistency. If too much cotton is allowed to enter the seed roll box enclosure, or more cotton than the gin saws can handle, the seed roll becomes packed and has a tendency to throw the seed out of the seed roll box and the cotton is forced hard against the saw-teeth. A tightly packed seed roll causes seed particles in the processed cotton fiber and a reduced grade of cotton, and also causes waste in fuel since more power is needed to drive the saws. If too little cotton is allowed to enter the seed roll box enclosure, the grade of the cotton will not be lowered, but the capacity of the gin stand or the amount of seed cotton processed will not be sufficient for practical operation because there are not enough seeds to keep it against the saw.

The speed at which a gin stand processes cotton or the amount of cotton processed in a certain time is dependent upon several factors other than the density of the seed roll. Thus the amount of moisture in the cotton, the maturity and size of the seed, and the ease of separating the fiber and seed of the particular kind of cotton, all are factors effecting the ginning speed or rate. These factors and the ginning rate vary with each bale or wagonload of cotton processed at the gin.

In order to minimize the effects of the above-mentioned factors and to improve the overall performance of the gin stand, a seed roll core is often utilized in gin stand machines. The typical seed roll core is arranged centrally and longitudinally in the seed roll box enclosure and forms a rigid structural core in and freely rotatable with the seed cotton roll.

Previous seed roll cores functioned very well when the cotton being ginned was in an optimum condition. However, when the cotton was above a certain moisture content, that is when the cotton was wet or damp or was rough, the previous cores often did not function properly.

Seed cotton, as it is being ginned, moves somewhat intermittently and lightly against the seed roll core and between the seed roll core and the teeth of the gin saws. Previous seed roll cores were substantially heavy and formed of cast iron or steel and had considerable inertial weight. The force of the seed cotton acting intermittently and lightly against the seed roll core often was not sufficient to turn the core particularly when the cotton was damp. The inertial weight of the core was great enough to retard turning thereof. When the seed roll core did not turn, or turned slowly, the seed cotton was not uniformly and efficiently processed, that is, it cut down on the ginning capacity.

A further problem with seed roll cores of prior design was the manner in which they were mounted in the seed roll box housing. In ginning overly moist or green and immature seed cotton, it is often desirable to remove the cores from the gin stand. Previous cores were mounted on brackets or the like, and considerable time and effort were spent in removing and replacing the core and in adjusting the machine for various seed cotton conditions.

The principal object of the present invention is to provide a seed cotton roll core for increasing the quantity of seed cotton processed by a gin stand.

A further object is to provide such a core which is quickly and easily installed in or removed from the seed roll box of a gin stand for quickly and easily adjusting the machine to the particular type or condition of cotton being ginned.

A further object is to provide such a core which facilitates more uniform and maximum loading of the gin saws.

A further object is to provide a substantially small diameter, light-weight core having minimum inertial weight, and such a core which turns with minimum effort even under different conditions of the cotton both damp and dry, and does not overcrowd the seed cotton into the teeth of the gin saws.

A further object is to provide such a core which continuously cleans the cotton at a more uniform rate and forms a more uniform grade of cotton throughout the cotton bale.

A further object is to provide a seed roll core which facilitates the effective processing of seed cotton from a wide range of field conditions and for processing such cotton with minimum adjustment or attention to the gin stand.

A further object is to provide a core of such design as to prevent cotton seed from becoming impacted respectively between the ends of the cylinder and the end walls of the gin stand; and such that would prevent the free turning of the core.

A further object is to provide a core which compensates substantially for the various types or conditions of cotton received at the gin.

A further object is to provide a seed roll core which facilitates a more uniform feed or gin saw loading and a more uniform seed roll density throughout the length of the roll.

The means by which the foregoing and other objects of the present invention are accomplished and the manner of their accomplishment will be readily understood from the following specification upon reference to the accompanying drawings, in which:

FIG. 1 is a cross-sectional schematic view of a cotton gin stand, illustrating the placement or environment of the seed roll core of the present invention.

FIG. 2 is a somewhat schematic illustration of the seed roll core structure and the gin stand wall support means therefor.

FIG. 3 is a cross-sectional view of the core taken as on the line III—III of FIG. 2.

FIG. 4 is an enlarged longitudinal sectional view taken as on the line IV—IV of FIG. 2.

In the drawings, FIG. 1 illustrates a typical gin stand 11 including a gang of gin saws 13 (one shown) mounted on a horizontally extending shaft 15, a multiplicity of ginning ribs 17 (one shown) fixedly arranged respectively in the spaces between saws 13, a multiplicity of huller ribs 19 (one shown), and a cylindrical doffer brush 21. Wall structure, indicated by numeral 23, and other support structure, not shown, house and support the various elements in the general arrangement illustrated in FIG. 1.

Wall structure 23 includes oppositely disposed end walls 25 and a somewhat interrupted cylindrical seed cotton roll box enclosure 27 extending between end walls 25. Typically, seed roll box enclosure 27 is provided with a broad slot 29 in the bottom or lower half portion thereof, and is so arranged that the upper rim portions respectively of gin saws 13 and the respective upper portions of ginning ribs 17 are disposed in slot 29 and protrude upwardly somewhat in the interior of box enclosure 27.

The seed roll core of the present invention is indicated by numeral 31 and is disposed in seed roll box 27 and supportably journaled from oppositely disposed end walls 25 of gin stand wall structure 23.

Included in gin stand 11 and schematically illustrated in FIG. 1 are cylindrical feed and huller brush rolls 33, huller gang saws 35, a cottonseed conveyor worm 37, and a lint conditioner roller 39. Wall structure 23 of gin stand 11 additionally includes a deflector board 41, a cottonseed conveyor trough 43, seed cotton intake and lint cotton exhaust slotted openings 45, 47, respectively, and an opening 49 for waste or foreign material.

Operationally, gin stand 11 functions in the following manner, as briefly described: Seed cotton C, after it has been fluffed and partially cleaned, is conducted through slotted intake opening 45 and onto deflector board 41. Feed and huller brushes 33, huller gang saws 35, and huller ribs 19 remove the cotton boll hulls from the seed cotton and regulate the feed of the cotton against the teeth of gin saws 13. The cleaned and fluffed seed cotton is picked up on the teeth of saws 13 and carried into seed roll box enclosure 27. Cotton entering roll box enclosure continuously forms seed cotton roll R which rotates somewhat slowly as the gin stand is operated. Seed cotton C is moved against ginning ribs 17, and roll R is rotated by the teeth of gin saws 13. The spacing of ginning ribs 17 is less than the cross-sectional size of a cotton seed, and as the gin saws turn, the seed of the cotton is urged against ginning ribs 17 and the cotton fiber F is pulled from the cottonseed and between the ribs. The cotton fiber is carried around the periphery of the gin saws 13 and is removed from the saws by the cylindrical doffer brush 21. Fiber F is centrifugally doffed from brush 21 and exhausted to the outside of gin stand wall structure 23 through lint cotton exhaust opening 47. The fiber-stripped cottonseeds S drop through the spaces between gin saws 13, beneath the saws, into cottonseed trough 43, and are conveyed from the gin stand by cottonseed conveyor worm 37. The cotton hulls H and other foreign material cleaned from the cotton by feed and huller brushes 33 and huller gang saws 35 are conducted from gin stand 11 through waste opening 49.

The seed roll core means of the present invention includes core 31 and hole means in end walls 25 of the gin stand wall structure for supporting the core in seed cotton roll box enclosure 27. Core 31 includes a tubular body member 51 and first and second hub assemblies 53, 55 disposed respectively at opposite ends of the tubular body member. Tubular body member 51 is formed of extruded aluminum alloy material and includes a plurality of integrally formed ribs 56 circumferentially arranged and equi-angularly spaced about the cylindrical periphery of the body member.

First hub assembly 53 includes, basically, an annular member 57, an axle 59, bearing means interengaging axle 59 and annular member 57, and spring means for urging axle 59 axially outwardly of tubular body member 51. Annular member 57 includes an annular base part 61 and a cylindrical core part 63. The outwardly disposed end portion of cylindrical core part 63 is press-fitted into the hollow center bore opening of annular base part 61, fixedly securing the parts together. A plurality of rivets 65, circumferentially arranged about tubular body member 51, fixedly secure annular member 57 in an end portion (the left hand end portion as viewed in FIGS. 2 and 4) of the tubular body member. Annular member 57 is concentrically arranged with the outer face surface 67 of base part 61 flush with end edge surface 69 of member 51.

The bearing means of first hub assembly 53 includes a ball bearing 71 and a sleeve bearing 73. The sleeve bearing 73 is fixedly fitted in the inner race 75 of ball bearing 71, and bearings 71, 73 are fitted in the annular recess of the bore opening of annular member 57. Outer race 77 of ball bearing 71 is fixedly fitted in anular member 57, and bearing 71 is securely retained by a snap-ring retainer 79. Axle member 59 is freely slidable or axially displaceable in sleeve bearing 73. A stop pin 81, fixedly fitted in axle 59 and engagable with inner race 75 of ball bearing 71, limits the outward axial movement of the axle member.

The spring means of first hub assembly 53 includes a coiled compression spring 83, a ball bearing 85, a center pin 87, and a snap-ring retainer 89. Center pin 87 is fixedly fitted in the inner race of ball bearing 85, and the center pin and ball bearing are secured in the inwardly disposed end portion of annular member core part 63 by retainer ring 89. The retainer rings engages only the outer race of ball bearing 85, with the inner race and center pin 87 being freely turnable relative to annular member 57. The outward end of spring 83 is fitted in a bore socket 91 in axle 59; the inward end of the spring is fitted concentrically around center pin 87 and engages ball bearing 85. Spring 83, based from annular member core part 63, yieldably urges axle 59 outwardly and stop pin 81 against sleeve bearing 73. Ball bearing 85 of the spring means of hub assembly 53 acts as a thrust bearing and a freely turnable base for spring 83.

Second hub assembly 55 includes, basically, a first annular member 93, a second annular member 95 supported from the first annular member, an axle 97, bearing means rotatably interengaging the axle and the second annular member, and first and second spring means. First annular member 93 of hub assembly 55 is substantially of like configuration as annular member base part 61 of hub assembly 53. A plurality of circumferentially spaced rivets 101 concentrically secure annular member 93 in tubular body member 51. Annular member 93 is recessed in the end of tubular body member 51, and outwardly disposed face surface 103 of annular member 93 is disposed some distance inwardly from end edge surface 105 of body member 51.

Second annular member 95 of hub assembly 55 is substantially like annular member 57 of hub assembly 53 and correspondingly includes an annular base part 107 and a cylindrical core part 109. Similarly, core part 109 is fixedly fitted in the center bore opening of base part 107 with annular member 95 slightly less than the inside diameter of tubular body member 51. Annular member 95 is supported from annular member 93 with the outer cylindrical surface 111 of core part 109 slidably engaging the interior cylindrical surface 99 of annular member 93.

The bearing means of hub assembly 55 is substantially like the bearing means of hub assembly 53 and, in like manner, includes a ball bearing 113 and a sleeve bearing 115 fitted in the central bore of annular member 95. The outer cylindrical surface of sleeve bearing 115 is fixedly fitted in the inner race 117 of ball bearing 113. Outer race 117 of the ball bearing fixedly engages annular member 95 and is secured with a snap-ring retainer 121. Axle 97 is a free-fit in the bore of sleeve bearing 115. Stop pin 123, fixedly fitted in axle 97, limits the outward axial displacement of the axle. Stop pin 123, in like manner as stop pin 81 of axle 59, is so arranged that when axle 97 is in a stopped position, the outward end portion thereof protrudes slightly past the annular edge of sleeve bearing 115.

The first spring means of second hub assembly 55 is substantially like the spring means of first hub assembly 53 and includes a spring 125, a ball bearing 127, a center pin 129, and a snap-ring retainer 131. Spring 125, fitted in axle socket 133 and around center pin 129, yieldably urges axle 97 outwardly and stop pin 123 against sleeve bearing 115.

The second spring means of hub assembly 55 includes a somewhat large coiled compression spring 135 interposedly disposed between annular members 93, 95. Spring 135 is convolutely mounted around the flanged center portion of annular member base part 107 and abuttingly engages respectively the outwardly disposed face surface 103 of annular member 93 and the inwardly disposed annular surface 137 of annular member 95. A stop pin 139 is fixedly fitted in cylindrical core part 109 of annular member 95. Stop pin 139 is adapted to abuttingly engage the inward annular surface 141 of first annular member 93, for securing the first and second annular members 93, 95, in an assembled relationship.

A hole 143 is provided in each wall of oppositely disposed end walls 25 of gin stand wall structure 23. Axles 59, 97 respectively of hub assemblies 53, 55 snugly fit and are received in holes 143 when core cylinder 31 is used with gin stand 11.

From the foregoing description, and illustration, it is apparent that seed roll core 31 may be quickly and easily installed in or removed from seed cotton roll box enclosure 27. Typically provided in gin stand art is a longitudinally extending access means 144 into the interior of seed cotton roll box enclosure 27. Holes 143 of end walls 25 are correspondingly aligned and are placed respectively at such locations that core 31 is rotatably supported at an optimum position relative to gin saws 13.

The following, briefly described, is the manner of installing seed roll core 31 in the gin stand: Access is gained into the interior of seed cotton roll box enclosure 27 through opening 144. The operator then inserts axle 97 of hub assembly 55 in hole 143 of one end wall 25. The operator may then manually press axle 59 inwardly. While restraining the parts, the operator moves hub assembly 53 downwardly until axle 59 aligns with and snaps outwardly in place in hole 143 in end wall 25.

In certain applications of core 31 and in certain gin stand structures, it may be desirable to compress axles 59, 97 inwardly and simultaneously, and with the oppositely disposed outer end surfaces respectively of the axles engaging the respective end wall, the core may then be moved downwardly in a horizontally extending disposition until the respective axles snap outwardly in place in the holes of the end walls. When it is desired to remove core 31, the operator has only to press inwardly on axles 59, 97 and lift the core cylinder upwardly and out of the gin stand roll box enclosure.

From the foregoing illustrations and description, it will be readily seen that second annular member 95 of hub assembly 55 is adapted to compensate for variations in the wall structure of various gin stands; that is, the distance between the respective end walls of gin stands varies; and by the action of spring 135, annular member 95 is moved outwardly and removes all end play from the core cylinder. Referring to FIG. 4, it will be noted that stop pin 139 of annular member 95 does not engage the inwardly disposed annular surface 141 of annular member 93 since annular member 95 is held inward and against the tension of spring 135 by opposing end walls 25. It will also be noted that core 31 is constructed in such a manner that the outer face surface 67 of hub assembly 53 is disposed closely adjacent the flat inner surface of respective end wall 25. Core 31 is thus constructed to leave only a slight gap 145, and such that prevents cottonseeds S from impacting between the core and the end wall. By the same token, annular member 95 of hub assembly 55 is constructed in such a manner that the outwardly disposed annular surface 147 is spaced closely adjacent the inner surface of the respective end wall and leaves but a slight gap, as indicated by numeral 149. Also, it will be noted that the gaps 145, 159 are the same regardless of the variations in the spacing between the gin end walls 25. This is so since it will be noted that the outer ends of sleeve bearings 73 and 115, which respectively engage the end walls 25, extend outwardly beyond the respective faces 67 and 147 by substantially the same amount.

The seed cotton roll core of the present invention is quickly and easily removed or installed in a gin stand for quickly and easily adjusting the stand for processing a particular type or condition of seed cotton. The present invention provides a substantially small-diametered, lightweight core which facilitates a more uniform feed or gin saw loading and a more uniform seed roll density throughout the length of the roll. It provides a core which cleans the cotton at a uniform rate and forms a uniform grade of cotton throughout the cotton bale. In addition, the present invention has the following advantages:

(1) It increases the ginning capacity of most all gin stands without damage to grade or staple length of the cotton.

(2) Built of light weight aluminum, with retractable shafts on each end to insert and remove from the gin stand in 10 seconds without using tools.

(3) Built to take care of variations between the end walls of the gin stand so that close tolerances are maintained at all times, which eliminates the possibility of seed or trash getting between the end of the roll and the end of the seed roll box.

(4) The lightness of the roll enables ginning as usual, particularly it is not necessary to drop the seed roll out of the gin stand, after the feed has stopped, before starting ginning on the stand again. In other words, the light weight enables ginning without changing ginning procedure and enables ginning damp cotton without removing from gin stand.

(5) Increases ginning capacity of gin stand by holding or forcing the seed in contact with the saws without major modifications to the gin stand, as was necessary with previous seed roll cores.

In summary, the present invention provides a seed cotton roll core which increases the quantity of seed cotton processed by a gin stand, while at the same time the grade of the cotton is maintained from any given cotton, and the seed is not damaged.

Although the invention has been described and illustrated with respect to a preferred embodiment thereof, it is to be understood that it is not to be so limited since changes and modifications may be made therein which are within the full intended scope of this invention as hereinafter claimed.

I claim:

1. A seed cotton roll core for mounting in a gin stand having means including gin stand end walls defining a pair of oppositely disposed holes, said core comprising a tubular body having a substantially cylindrical periphery, first and second hub assemblies disposed respectively at opposite ends of said tubular body; said first hub assembly including a first annular member fixedly secured concentrically in one end of said tubular body, a first axle, first bearing means interengaging said first axle and said first annular member with said first axle being axially displaceable, first spring means biased from said first annular member for yieldably urging said first axle axially outwardly of said tubular body, and means for limiting the axial displacement of said first axle; said second hub assembly including a second annular member fixedly secured concentrically in the end of said tubular body opposite from said first hub assembly, a third annular member axially movably secured in said tubular body, a second axle, second bearing means interengaging said second axle and said third annular member with said second axle being axially displaceable, second spring means biased from said third annular member for yieldably urging said second axle axially outwardly of said tubular body, means for limiting the axial displacement of said second axle; and third spring means for yieldably urging said third annular member, said second axle, said second bearing means and said second spring means axially outwardly of said tubular body; said tubular body being adapted to be rotatably supported in said seed cotton roll box enclosure with said first and second axles respectively of said first and second hub assemblies being fitted in said holes in said oppositely disposed end walls of said gin stand wall structure, with said third spring means urging said third annular member of said second hub assembly toward one wall of said gin stand wall structure, and with said first and second spring means respectively of said first and second hub assemblies urging said first and second axles respectively oppositely and securely in the respective holes of said end walls of said gin stand wall structure.

2. The seed cotton roll core cylinder means of claim 1 in which the cylindrical periphery of said tubular body includes a plurality of circumferentially arranged and equi-angularly spaced ribs respectively extending the length of said tubular body.

3. A seed cotton roll core for mounting in a gin stand having means including gin stand end walls defining a pair of oppositely disposed holes, said core comprising a tubular body having a substantially cylindrical periphery, first and second hub assemblies disposed respectively at opposite ends of said tubular body; said first hub assembly including a first annular member fixedly secured concentrically in one end of said tubular body, a first axle, first means interengaging said first axle and said first annular member with said first axle being axially displaceable, first spring means biased from said first annular member for yieldably urging said first axle axially outwardly of said tubular body, and means for limiting the axial displacement of said first axle; said second hub assembly including a second axle, means movably supporting said second axle from said tubular body for axial movement relative thereto, and second spring means mounted from said tubular body for yieldably urging said second axle axially outwardly of said tubular body; means for limiting the axial displacement of said second axle; said tubular body being rotatably supported in said seed cotton roll box structure with said first and second axles respectively of said first and second hub assemblies being fitted respectively in said holes of said oppositely disposed end walls of said gin stand wall structure, with said first and second spring means respectively of said first and second hub assemblies urging said first and second axles respectively oppositely and securely in said holes of said end walls of said gin stand wall structure.

4. A gin stand cotton roll core for mounting in a gin stand having means including gin stand end walls defining a pair of oppositely disposed holes, said core comprising a tubular body having a substantially cylindrical periphery, first and second hub assemblies disposed respectively at the opposite left and right end portions of said tubular body, said first hub assembly including a first annular member fixedly secured concentrically in said left end portion of said tubular body, a first axle, first ball bearing means interengaging said first axle and said first annular member with said first axle being axially displaceable, first coiled compression spring means biased from said first annular member for yieldably urging said first axle axially outwardly of said tubular body, and means for limiting the axial displacement of said axle; said second hub assembly including a second annular member fixedly secured concentrically in said right end portion of said tubular body, a third annular member supported from and axially displaceable relative to said second annular member, with said third annular member being substantially telescopically fitted in said right end portion of said tubular body, a second axle, second ball bearing means interengaging said second axle and said third annular member with said second axle being axially displaceable, second coiled compression spring means biased from said third annular member for yieldably urging said second axle axially outwardly of said tubular body, means for limiting axial displacement of said second axle; and third coiled compression spring means for yieldably urging said third annular member, said second axle, said second ball bearing means, and said second coil compression spring means axially outwardly of said tubular body; said tubular body being rotatably supported in said seed cotton roll box enclosure, with said third coiled compression spring means urging said third annular member of said second hub assembly toward one wall of said gin stand wall structure, and with said first and second coiled compression spring means respectively of said first and second hub assemblies urging said first and second axles respectively oppositely and securely in said holes of said end walls of said gin stand wall structure.

5. The seed cotton roll core means of claim 4 in which said coil compression spring means of said first and second hub assemblies respectively include ball bearing thrust bearings for basing said spring means respectively from said annular members.

6. A seed cotton roll core adapted for mounting in a gin stand having means including left and right oppositely disposed end walls defining respectively left and right oppositely disposed holes, said roll core comprising a tubular generally cylindrical body having oppositely disposed left and right end portions, each portion having an end surface arranged generally in a plane lying normal to the axis of said body, left and right annular hubs arranged respectively concentrically in left and right portions of said tubular body, left and right sleeve bearings fitted concentrically coaxially respectively in said left and right annular hubs, each sleeve bearing including a radial face surface adapted to abuttingly engage respectively the left and right end walls of said gin stand, said left sleeve bearing being axially fixedly arranged with the face surface thereof being in a plane only slightly distant from and parallel to the plane of the face surface of said right annular hub, said right annular hub being axially displaceably constrained concentrically in said right end portion of said body and axially projectable outwardly away from said right end portion of said body with said face surface of said annular hub being arranged parallel with and inwardly and outwardly displaceable relative to said end surface of said right end portion of said body, coiled compression spring means reacting between said body and said right hub for axially moving said right hub outwardly from said right end portion of said body, and axle means including left and right axle end portions extending through and projecting respectively coaxially outwardly from said left and right sleeve bearings, said roll core being adapted for mounting in said gin stand with said left and right axle end portions being operatively received respectively in said oppositely disposed holes of said gin stand end walls.

7. The seed cotton roll core of claim 6 in which at least one coiled compression spring is arranged between said left and right axle end portions for yieldably urging said axle end portions in opposite directions, and for yieldably projecting said left and right axle portions respectively into the holes of said left and right gin stand end walls.

8. A seed cotton roll core for mounting in a cotton gin stand having means including end walls defining a pair of oppositely disposed holes, said core comprising a substantially tubular body, one fixed and one movable annular hub coaxially arranged respectively in opposite ends of said body, a pair of axle means for reception in said holes, means mounting said axles from said annular hubs and including means movably mounting at least one of said axles for axial movement, spring means operably attached to said one of said axles for the urging outwardly thereof and means carried by at least one of said annular hubs including compression spring means for closely spacing said annular members respectively from said gin stand end walls.

9. The seed cotton roll core of claim 8 in which said tubular body is composed of aluminum.

10. A high capacity seed cotton roll core for snap-mounting in a cotton gin stand having means including gin stand end walls defining a pair of oppositely disposed holes, said core comprising a substantially tubular body, a pair of hub assemblies in opposite ends of said tubular body, one of said hub assemblies including an annular member stationarily mounted in said tubular body and the other of said hub assemblies including another annular member movably mounted in said tubular body for movement axially of said tubular body, axle means respectively mounted from said annular members for reception in said holes, and means carried by said annular members for closely spacing said annular members from said end walls.

References Cited
UNITED STATES PATENTS

| | | | |
|---|---|---|---|
| 1,455,685 | 5/1923 | Vardell | 19—55 |
| 2,046,550 | 7/1936 | Daniels | 242—129.6 |

MERVIN STEIN, *Primary Examiner.*

I. C. WADDEY, *Assistant Examiner.*